(12) United States Patent
Burmester et al.

(10) Patent No.: US 10,989,823 B2
(45) Date of Patent: Apr. 27, 2021

(54) NEUTRON DETECTOR

(71) Applicant: Helmholtz-Zentrum Geesthacht Zentrum für Material- und Küstenforschung GmbH, Geesthacht (DE)

(72) Inventors: Jörg Burmester, Lauenburg (DE); Gregor Jacek Nowak, Hamburg (DE); Jörn Plewka, Geesthacht (DE); Christian Jacobsen, Winsen (DE); Carsten Peter Gregersen, Lauenburg (DE); Wolfgang Puls, Lauenburg (DE); Andreas Beldowski, Lübeck (DE); Dirk Jan Siemers, Dahmker (DE); Rüdiger Kiehn, Börnsen (DE); Sven Kleeband, Geesthacht (DE); Thorsten Böttcher, Geesthacht (DE); Gerd Musielak, Geesthacht (DE); Erik Sitko, Altenmoor (DE); John Hedde, Wendisch Evern (DE)

(73) Assignee: Helmholtz-Zentrum Geesthacht Zentrum Für Material- und Küstenforschung GmbH

(*) Notice: Subject to any disclaimer, the term of this patent is extended or adjusted under 35 U.S.C. 154(b) by 0 days.

(21) Appl. No.: 16/635,178

(22) PCT Filed: Jul. 19, 2018

(86) PCT No.: PCT/EP2018/069577
§ 371 (c)(1),
(2) Date: Jan. 30, 2020

(87) PCT Pub. No.: WO2019/025196
PCT Pub. Date: Feb. 7, 2019

(65) Prior Publication Data
US 2021/0096272 A1    Apr. 1, 2021

(30) Foreign Application Priority Data

Aug. 4, 2017  (EP) .................... 17184906

(51) Int. Cl.
*G01T 3/00*   (2006.01)

(52) U.S. Cl.
CPC .................... *G01T 3/008* (2013.01)

(58) Field of Classification Search
CPC .................................................. G01T 3/008
See application file for complete search history.

(56) References Cited

U.S. PATENT DOCUMENTS

| 9,116,249 B1 | 8/2015 | Claus et al. |
| 2013/0068957 A1 | 3/2013 | Stephan et al. |
| 2013/0091763 A1* | 4/2013 | Rottner ............... C01B 35/023 44/504 |

FOREIGN PATENT DOCUMENTS

| EP | 3187902 A1 | 7/2017 |
| WO | 2015/088748 A1 | 6/2015 |
| WO | 2015/173540 A1 | 11/2015 |

OTHER PUBLICATIONS

European communication dated Feb. 27, 2018 in corresponding European patent application No. 17184906.0.

(Continued)

*Primary Examiner* — David P Porta
*Assistant Examiner* — Meenakshi S Sahu
(74) *Attorney, Agent, or Firm* — Nields, Lemack & Frame, LLC

(57) ABSTRACT

The present invention relates to a neutron detector that for the first time permits the construction of large detector areas of approximately 1 m² to 2 m², with a spatial resolution of the neutrons of under 2 mm. It is additionally possible in the case of the modular construction in a stack arrangement to (Continued)

attain detection sensitivities that are comparable to $^3$He counter tubes (ca. 60%) or, with a greater number of detector elements, higher. By using thin substrate plates—such as aluminum sheets—and omission of the external pressure vessels, the neutron detectors are relatively lightweight despite their large dimensions and can be produced inexpensively.

The neutron detector comprises at least one module (detector element) comprising in each case two mutually parallel substrate plates made from a first neutron-transparent material, with said plates being spanned in each case on a self-supporting frame made of a second neutron-transparent material and being coated with a neutron absorber material on a side that is remote from the self-supporting frame, wherein the side that is coated with a neutron absorber material faces the respectively other substrate plate on an inner side, and a gas-tight measurement space, which is filled with a counter gas and in which two electrode wire planes, arranged parallel to the substrate plates, having electrode wires that run parallel in the respective electrode wire planes are arranged and in which the electrode wire planes are spaced apart from one another by way of a spacer frame, is defined between the mutually facing, coated inner sides of the substrate plates. The modules can be arranged successively in a stack arrangement.

13 Claims, 2 Drawing Sheets

(56) References Cited

OTHER PUBLICATIONS

International Search Report dated Oct. 18, 2018 in corresponding PCT application No. PCT/EP2018/069577.
Buffet et al., "Study of a 10B-based Multi-Blade Detector for Neutron Scattering Science", 2012 IEEE Nuclear Science Symposium and Medical Imaging Conference Record, pp. 171-175, Nov. 15, 2012.
Piscitelli et al., "Study of a High Spatial Resolution 10B-based Thermal Neutron Detector for Application in Neutron Reflectometry: The Multi-Blade Prototype", Journal of Instrumentation, vol. 9, No. 3, Mar. 12, 2014.
Sanabria et al., "Patallel-plate Avalanche Detectors with Anode Wire Grids", Nuclear Instruments & Methods in Physics Research A, vol. 441, No. 3, pp. 525-534, Mar. 1, 2000.

* cited by examiner

NEUTRON DETECTOR

The present invention relates to neutron detectors and to their use.

BACKGROUND OF THE INVENTION

Neutron detectors serve for the detection of, the measurement of the flux of and for the spectroscopy of free neutrons, for example in radiation protection monitoring or fundamental research. Since neutrons lack a charge and therefore interact only weakly with matter, the presence thereof must be detected by way of nuclear reactions with a suitable neutron absorber material, during which charge carriers or charged radionuclides are produced, which are detectable using suitable detectors, for example counter tubes filled with a counter gas.

The interaction of particles with the neutron absorber material is described by the cross section $\sigma$, having the dimension of an area with the unit 1 barn ($10^{-24}$ cm$^2$). The total cross section $\sigma_{tot}$ can be calculated from the number of interactions per unit time divided by the incident particle flux density. The secondary particles produced during the interaction should have a sufficient free path in the counter gas so that said particles can reach the sensitive region of the detector and deposit energy there that is sufficiently great for detection. The conversion of the deposited energy into ionization is then of significance for the detection.

Conventional neutron absorber materials will be described below:

The isotope of $^3$He ($^3$He+n→$^3$H+$^1$H+0.764 MeV; $\sigma$=5.327 barns), a material that produces a proton and a triton after neutron capture, is widely used in proportional counter tubes. The advantage is large cross sections and a small atomic number (Z=2), ensuring a low $\gamma$-sensitivity of the detector. One disadvantage is the long path length of the reaction product in the gas, which has a negative effect on the spatial resolution. A neutron detector arrangement having a multiplicity of separate neutron detectors based on $^3$He is known, for example, from WO 2015/088748 A1.

The conversion material $^6$Li ($^6$Li+n→$^3$H+$\alpha$+4.78 MeV; $\sigma$=940 barns) is typically used in scintillators, either as a doping agent or as a constituent part of the scintillator crystal. However, it can also be used as a converter film in gas detectors. The major advantage is the large amount of liberated energy during the reaction process. Unfortunately, the cross section is relatively small and the handling is complicated. A neutron detector arrangement having a multiplicity of neutron detector elements based on $^6$Li is known, for example, from WO 2015/173540 A1. The scintillation material used is ZnS(Ag), mixed with $^6$LiF as the neutron absorption material.

$^{10}$B ($^{10}$B+n→$^7$Li+$\alpha$+2.792 MeV (6%); $\sigma$=3.842 barns) is used in gas detectors with fillings of BF$_3$ and is difficult to handle on account of its poisonousness. In solid-state detectors, it is used as a chemically inert B$_4$C either as a doping agent or as a thin converter film. The cross section is up to 4 times greater than that of $^6$Li, and the liberated energy is sufficient to produce a detectable signal. A neutron detector arrangement having a multiplicity of polygonal neutron detector elements doped with $^{10}$B is known, for example, from EP 3 187 902 A1.

Gadolinium has seven stable natural isotopes, wherein $^{157}$Gd (15.68% natural abundance) with 254 000 barns has the largest known capture cross section for thermal neutrons of all known atoms ($^{157}$Gd+n→$^{158}$Gd*→$^{158}$Gd+$\gamma$+e$^-$+29 keV-181 keV; $\sigma$=254 000 barns). The isotope $^{155}$Gd having a relative abundance of 14.73 percent still has a high capture cross section of 61 000 barns ($^{155}$Gd+n→$^{156}$Gd*→$^{156}$Gd+$\gamma$+e$^-$ (29 keV-181 keV; $\sigma$=61 000 barns). Natural gadolinium or gadolinium having a natural isotope distribution has a mean capture cross section of 49 000 barns. However, gadolinium is not often used on account of the associated high costs and difficult handling. A neutron detector using gadolinium is known, for example, from DE 199 614 452 A1.

Neutron detectors of the prior art use an external pressure vessel that ensures the required fill pressures (several MPa) of the detection volume filled with a counter gas. The presence of a pressure vessel and the associated gas-tight electrical ducts entails additional outlay. The relatively large weight of the detector having an external pressure vessel not only makes manufacturing but also the handling of the neutron detector during operation more difficult. In addition, it has hitherto not been possible to produce large-area neutron detectors (m$^2$ class) having a high capture cross section with simultaneous high spatial resolution.

Is an object of the present invention to provide a neutron detector having a similarly high efficiency as a neutron detector based on $^3$He, but one that operates without an external pressure vessel. In addition, the detectors should have a large detection area with simultaneously high spatial resolution.

SUMMARY OF THE INVENTION

The object is achieved by a neutron detector having the features of claim 1. The neutron detector according to the invention comprises an arrangement of at least one detector element comprising in each case two mutually parallel substrate plates made from a first neutron-transparent material, with said plates being spanned in each case on a self-supporting frame made of a second neutron-transparent material to form a compensation volume and being coated with a neutron absorber material on a side that is remote from the compensation volume, wherein the sides that are coated with a neutron absorber material face a respectively other substrate plate having a neutron absorber material, and a gas-tight measurement space, which is filled with a counter gas and in which two electrode wire planes, arranged parallel to the substrate plates, having electrode wires that run parallel in the respective electrode wire planes are arranged and in which the electrode wire planes are spaced apart from one another by way of a spacer frame, is defined between the mutually facing, coated substrate plates.

A voltage, typically a high voltage (≥+/−1 kV), is applied to the electrode wires. Due to a high voltage being applied, the charges produced by way of the neutron absorber material are accelerated such that a gas amplification occurs due to charge multiplication in the counter gas and transfer the resulting charge avalanche to the electrode wire planes. The electrode wires of the two electrode wire planes are preferably arranged at a right angle with respect to the electrode wires of the respectively other electrode wire plane to form an electrode wire grid, with the result that the location of the neutron event can be determined using a time-of-flight measurement of the signals on a delay line.

The first neutron-transparent material of the substrate plates and the second neutron-transparent material of the self-supporting frame can be any processable material that has a sufficient neutron transparency. The first neutron-transparent material of the substrate plates and/or the second neutron-transparent frame material is preferably selected from copper or in particular from aluminum. With further preference, the first and the second neutron-transparent materials are the same. The substrate plates preferably have a thickness of between 20 µm and 600 µm. The self-supporting frames preferably have a thickness of from 2 to 5 mm and, depending on the size of the frame, preferably a frame width of 1 cm to 20 cm. "Self-supporting" in the context of the invention means that the frame does not have any additional supports. The self-supporting frames are preferably each formed as one piece.

The coated substrate plates are preferably rectangular, in particular square, and preferably have a side length of 20 cm to 2 m, in particular of 50 cm to 1.2 m. It is consequently possible with the detector construction according to the invention to produce neutron detectors having an unusually large detection area ($m^2$ class) with a simultaneously high spatial resolution.

The neutron absorber material can comprise $^6$Li, $^{10}$B or gadolinium and is preferably $^{10}B_4C$. The $^{10}B_4C$ coating is preferably applied on the substrate plates with a layer thickness of 500 nm to 1.5 µm, more preferably 1 µm to 1.2 µm. The coating is preferably applied by way of sputtering.

The substrate plates made of a first neutron-transparent material are preferably adhesively bonded to the self-supporting frame made of a second neutron-transparent material. Epoxy resin adhesive or acrylic resin adhesive is preferably used for the adhesive bond.

The counter gas used in the measurement space is preferably a mixture of argon and $CO_2$ ($Ar/CO_2$) or $CF_4$ or mixtures thereof. The counter gas pressure in the measurement space is preferably 100 to 130 kPa. A high voltage of ≥1 kV, preferably of between 1.5 and 3.5 kV, is preferably applied to the electrode wires, with the voltage being specified as an absolute value.

The electrode wires in the two electrode wire planes in each case have a spacing of 1 to 3 mm, preferably approximately 2 mm.

The spacing between the two electrode wire planes is preferably between 1.2 and 4 mm, with preference between 1.6 and 3 mm.

According to a further embodiment according to the invention, provision is made for the neutron detector according to the invention to comprise a stack arrangement of a plurality of, for example 2 and more, preferably between 2 and 18, with particular preference between 4 and 15, in particular between 8 and 12, detector elements. Detector elements are preferably in each case arranged such that the respective self-supporting frames are joined together so as to cover one another, wherein a gas passage is provided at least at one side, preferably at two sides, of the joined self-sporting frames, to form a variable compensation volume. The self-supporting frames that have been joined together so as to cover one another are preferably adhesively bonded together, wherein an acrylic resin adhesive is likewise preferably used.

Alternatively, it is possible in this stack arrangement for substrate plates made from a first neutron-transparent material to be spanned on both sides of a self-supporting frame, wherein the self-supporting frame, on whose two sides the plates are spanned, forms the termination of two adjoining detector elements, wherein a gas passage is provided at least at one side, preferably at two sides, of the self-supporting-frames that have been joined together, to form a variable compensation volume.

The inner side of the self-supporting frame in the stack arrangement forms, together with the coated substrate plates that are spanned thereon, a variable compensation volume. If the detection areas become very large (e.g. >0.5 $m^2$), the mechanical challenges with respect to the construction of the neutron detectors also increase. In order to achieve undisturbed spatial resolution of the measurement, the coated substrate plates should be as even as possible. This is because a short distance between coated substrate plates and electrode wire planes in combination with the high voltage that is applied during the measurement results in coated substrate plates and electrode wire planes attracting one another, with the result that the substrate plates warp, which can lead to high voltage flashovers. It is possible to compensate the warping of the substrate plates by way of the gas space having a variable compensation volume between the detector elements. The distance between wire planes and substrate plates can be set such that both planes are oriented parallel to one another over the entire area. The detection plane lying between the inner sides of the substrate plates is filled with a quantity of a counter gas that does not vary during operation. The compensation volume opposite the respective substrate plates is likewise filled with a gas. Both volumes (detector and compensation volumes) can be monitored using pressure sensors. If required, the pressure of the compensation volume is adapted by way of control elements so as to avoid the deflection of the substrate plates, which are coated with a neutron absorber material, toward the electrode wire plane. An external pressure vessel for controlling or maintaining the pressure in the measurement space can thus be omitted. Any neutron-transparent gas can be used as the gas in the gas space with a variable compensation volume because it does not come into contact with the counter gas. With preference, however, the same gas as the counter gas is used.

The detector elements which are connected together in a stack arrangement preferably have a varying coating thickness, for example an increasing coating thickness of 500 µm in the first detector element (e.g. in the 1st module) up to 1.5 µm in the last detector element (e.g. in the 12th module).

Each detector element in the stack arrangement is preferably provided with dedicated evaluation electronics. Evaluation electronics according to the prior art are used here, preferably higher integrated, remotely controllable evaluation electronics. They can have a pre-amplifier and a constant fraction unit per channel (4 channels per detector plane). The signals are typically connected to an FPGA board and the edges (positive and negative) are provided with a time stamp. A delay line consisting of a printed circuit board and in which the delay elements are integrated is special. Said delay line can be connected to the pre-amplifiers by way of high-voltage-resistant transmitters and be operated at the high-voltage potential.

DETAILED DESCRIPTION OF THE INVENTION

The invention will now be explained in more detail with reference to the attached figures, which do not limit the invention but merely explain it by way of example.

Figure 1:
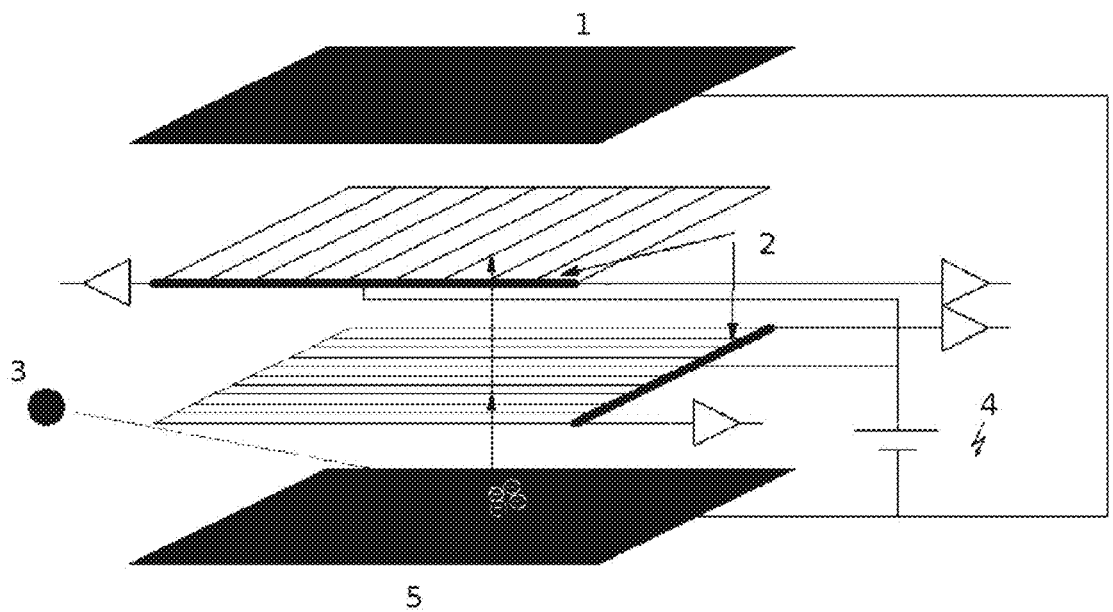
FIG. 1 shows a diagram of a detector element according to the invention.

FIG. 1 shows a diagram of two layers 1, 5 of neutron absorber material $^{10}B_4C$, which are arranged parallel to one another, face one another and are applied onto two mutually parallel substrate plates made from a neuron-transparent material (not shown) by way of sputtering. Furthermore, two mutually parallel electrode wire planes are provided between the $^{10}B_4C$-layers 1, 5 that face one another, wherein the electrode wires of the two electrode wire planes are arranged at an angle of 90° with respect to the orientation of the respectively other electrode wire plane to form an electrode wire grid. A high voltage 4 (≥+−1 kV) is applied to the electrode wires. Voltage changes are captured on a delay line 2 with a high spatial resolution.

When a neutron 3 is incident on one of the $^{10}B_4C$ layers 1, 5, the counter gas is ionized as a consequence of the resulting nuclear reaction with the $^{10}B$ and the voltage change is detected by way of the electrode grid. Rather than $^{10}B_4C$, other solid neutron absorption materials such as $^6Li$, which is preferably used in the form of $^6LiF$, or gadolinium are able to be used for the neutron detection in the neutron detector according to the invention. $^{10}B_4C$ layers are preferred on account of their handling characteristic and for cost reasons.

Figure 2:
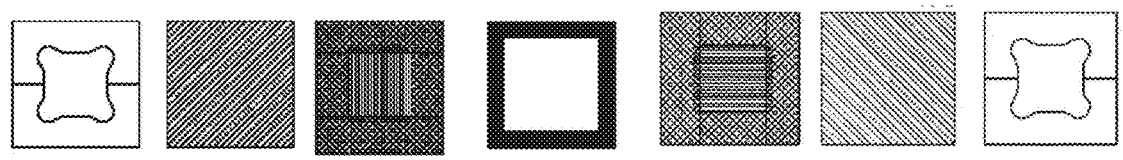
FIG. 2 shows a diagram in plan view of the individual constituent parts of a detector element.

FIG. 2 shows a diagram in plan view of the individual constituent parts of a detector element. The figure shows, from left to right, a self-supporting frame made from a neutron-transparent material, which is preferably square. Notches, which form a gas passage when two frames are joined together, are provided on both lateral sides. Shown next is a substrate plate coated with a neutron absorber material, which substrate plate is spanned with the side located opposite the coating on the self-supporting frame and is adhesively bonded thereto. The purpose of the spanning is that the substrate plate and coating are as even and wrinkle-free as possible. For the purposes of spanning, the self-supporting frame is slightly pushed inward on its transverse and lateral sides, the substrate plate is adhesively bonded to the frame by way of its side that is opposite the coating side, and the frame is relaxed after curing of the adhesive. A printed circuit board having electrode wire planes, which are shown as a third element, is adhesively bonded to the coated substrate plate. The same construction is repeated in the depiction from right to left and the resulting constructions are connected to one another via a spacer frame, shown here in the center, with a 90° offset. The gas space is filled with a counter gas and adhesively bonded to be gas-tight.

Figure 3:
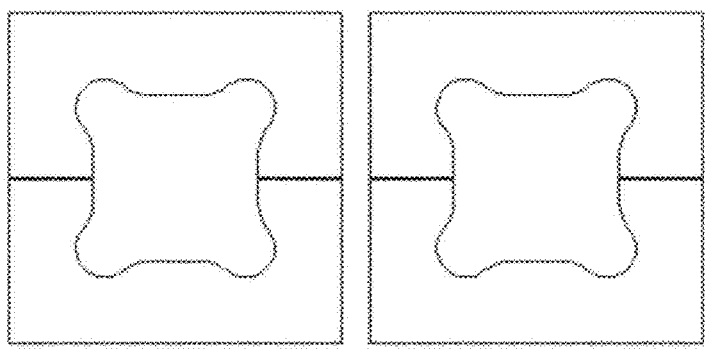
FIG. 3 shows a plan view of two self-supporting frames, which can be joined together so as to cover one another to form a stack arrangement of detector elements according to the invention.

FIG. 3 shows a plan view of two self-supporting frames, which form in each case a termination side of a detector element. Notches, which form a gas passage with an interior gas space when two frames are joined together, are provided on both lateral sides. The compensation volume in the gas space can be controlled by way of the gas passage such that a curvature of the substrate plates can be compensated by lowering or increasing the gas pressure in the compensation volume.

Figure 4:
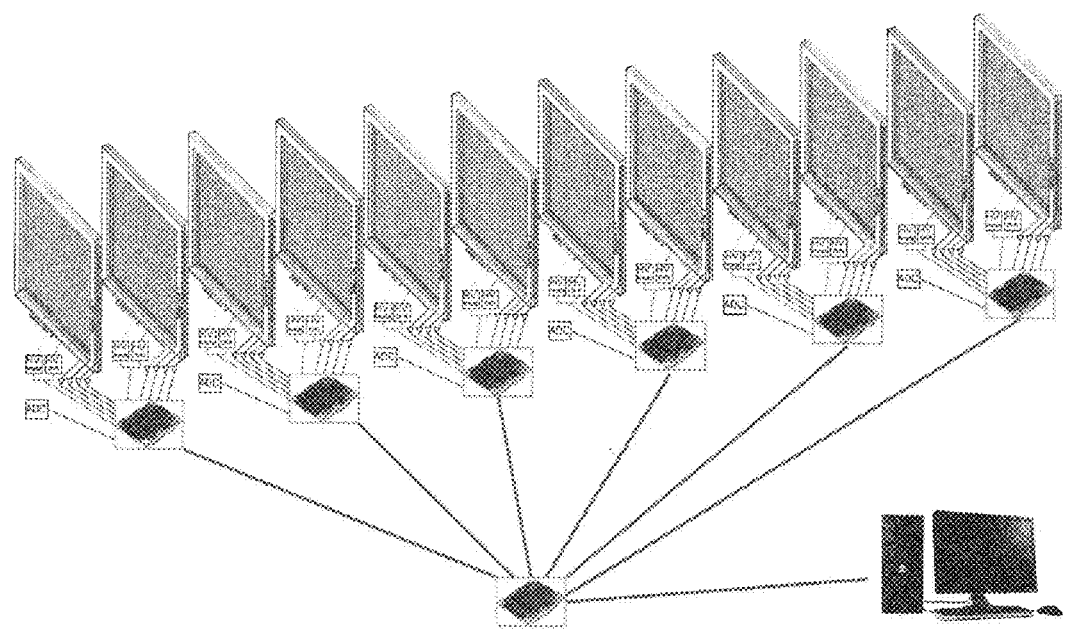
FIG. 4 shows a diagram of a neutron detector having a stack arrangement of 12 detector elements, which are arranged parallel to one another.

FIG. 4 shows a diagram of a stacked arrangement of 12 detector elements, with each detector element having dedicated counter electronics. Using the stack arrangement shown, it is possible to achieve a detection sensitivity like in a $^3He$ counter tube, but with a much larger detection area than is possible with conventional neutron detectors.

For the first time, the neutron detectors according to the invention permit the construction of large detector areas of approximately 1 m² to 2 m², with a spatial resolution of the neurons of under 2 mm. In the case of a modular construction in a stack arrangement, it is additionally possible to attain detection sensitivities that are comparable to $^3He$ counter tubes (ca. 60%) or, with a greater number of detector elements, higher. By using thin substrate plates—such as aluminum sheets—and omission of the external pressure vessels, the neutron detectors are relatively lightweight despite their large dimensions and can be produced inexpensively.

The invention claimed is:

1. A neutron detector, comprising a stack arrangement of two or more detector elements, each with two mutually parallel substrate plates made from a first neutron-transparent material, which are coated on mutually facing sides with a neutron absorber material, and there being defined between the coated substrate plates facing each other a measurement space filled with a counter gas, in which two electrode wire planes, arranged parallel to the substrate plates, having electrode wires running parallel in the respective electrode wire planes are arranged, and the electrode wire planes being spaced apart from one another by means of a spacing frame, characterized in that the measurement space is gas-tight and the substrate plates being spanned between the detector elements at a side facing away from the measurement space in each case on a self-supporting frame made of a second neutron-transparent material to form a compensation volume, wherein in each case two detector elements are arranged such that the respective self-supporting frames are joined together so as to cover one another, wherein a gas passage is provided at least at one side of the joined self-supporting frames, to form a variable compensation volume.

2. The neutron detector as claimed in claim 1, wherein the first neutron-transparent material of the substrate plates and the second neutron-transparent material are in each case identical and are copper or aluminum.

3. The neutron detector as claimed in claim 1, in which the electrode wires of the two electrode wire planes are arranged at an angle of 90° with respect to the orientation of the respectively other electrode wire plane to form an electrode wire grid.

4. The neutron detector as claimed in claim 1, wherein the electrode wires in the two electrode wire planes in each case have a spacing of 1 to 3 mm.

5. The neutron detector as claimed in claim 1, wherein the spacing of the two electrode wire planes relative to one another is between 1.2 and 4 mm.

6. The neutron detector as claimed in claim 1, wherein the neutron absorber material comprises $^6Li$, $^{10}B$ or gadolinium.

7. The neutron detector as claimed in claim 6, wherein the neutron absorber material is $^{10}B_4C$.

8. The neutron detector as claimed in claim 1, wherein the layer thickness of the neutron absorber material on the substrate plate is 500 nm to 1.5 μm.

9. The neutron detector as claimed in claim 8, wherein the layer thickness of the neutron absorber material on the substrate plate is 1 μm to 1.2 μm.

10. The neutron detector as claimed in claim 1, comprising a stack arrangement of 4 and 18 detector elements.

11. The neutron detector as claimed in claim 10, comprising a stack arrangement of 8 and 12 detector elements.

12. The neutron detector as claimed in claim 1, wherein substrate plates made from a first neutron-transparent material are spanned on both sides of a self-supporting frame, wherein the self-supporting frame, on whose two sides the plates are spanned, forms the termination of two adjoining detector elements, and wherein a gas passage is provided at least at one side of the self-supporting-frames that have been joined together, to form a variable compensation volume.

13. The use of a neutron detector as claimed in claim 1 for detecting neutrons.

* * * * *